Dec. 4, 1934.  J. R. BURCH  1,982,947
ELECTRIC GRILL
Filed Feb. 1, 1932

INVENTOR
Julian R. Burch.
BY
ATTORNEY

Patented Dec. 4, 1934

1,982,947

UNITED STATES PATENT OFFICE 1,982,947

ELECTRIC GRILL

Julian R. Burch, St. Louis, Mo.

Application February 1, 1932, Serial No. 590,164

2 Claims. (Cl. 219—37)

This invention relates generally to electrical cooking appliances and has more particular reference to a certain new and useful improvement in electrically-heated grills and the like.

Heretofore, so far as I am aware, electrical cooking grills have been constructed with grids or cooking-plates having relatively deep marginally depending flanges or side walls for enclosing the heating-elements of the appliance. As such grid-side walls are integrally connected with and are hence of the same metal as the grid proper, a very considerable loss of heat from the grid occurs by radiation from the grid-side walls, which heat is wholly lost for cooking purposes, resulting in the uneconomical and inefficient operation of the appliance.

My present invention has hence for its prime objects the provision of an electrical grill having a cooking-top comprising separable elements including a grid and a housing for enclosing the heating-elements, the housing being constructed of a material having a relatively less thermal conductance than that of the grid; the provision, in an appliance of the character set forth, of a grid having its non-cooking sides substantially insulated against loss of heat therefrom; and to generally simplify and improve the construction and efficiency of electrically heated cooking grills.

And with the above and other objects in view, my invention resides in the novel features of form, construction, arrangement, and combination of parts hereinafter described and pointed out in the claims.

In the accompanying drawing,—

Figure 1:
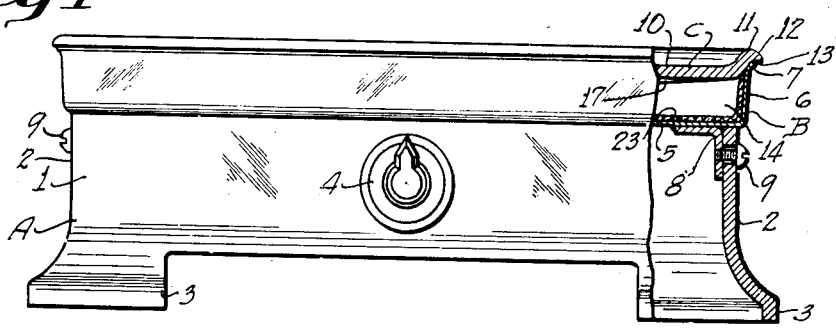
Figure 1 is a front elevational view, partly in section, of an electrically heated cooking grill of my invention.

Referring now more in detail and by reference characters to the drawing, which illustrates a preferred embodiment of my invention, A designates the base of the appliance, which preferably comprises a rectangular box-like frame or bed-casting having integrally connected side walls 1 and end walls 2, the corners of the base A having artistically outwardly flaring depending feet or legs 3 for engaging a table or like support, and a suitable electrical switching device 4 being mounted conveniently on one of the side-walls 1, as best seen in Figure 1.

Figure 3:
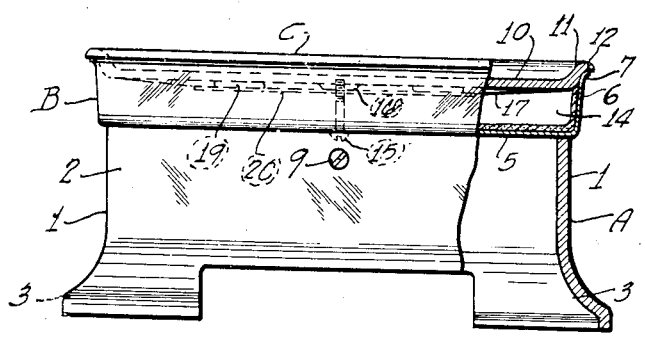
Figure 3 is a partly sectional end side view of the grill.

The cooking-top of the appliance includes a relatively deep pan-like shell or housing B of pressed sheet-metal or the like and comprising a bottom-wall 5 having preferably an integrally connected upstanding slightly flaring side-wall 6 terminating in a continuous pan-encircling curled or outwardly rolled rim 7, the bottom wall 5 flatwise resting upon the upper margin of the base-walls 1, 2, to which the housing B is detachably secured by means of angular lugs or clips 8 preferably welded or otherwise integrally connected to the wall 5 and depending therefrom inside the respective base-end-walls 2, suitable fastening elements or screws 9 being passed through the walls 2 for threadedly engaging the clips 8, as best seen in Figures 1 and 3.

C designates the grid or cooking-plate proper, which preferably comprises a flat plate-like casting 10 of aluminum or other suitable metal of relatively high thermal conductivity when compared with the thermal conductivity of the housing B, all the corners and edges of the upper cooking surface of the grid C being preferably carefully rounded for avoiding the formation of grease pockets and the like. The plate 10 is provided with an integral marginally raised flange or rim 11 having a rounded upper surface terminating in a continuous acuminate outer drip edge 12, the rim 11 being formed on its underside with a marginal groove 13 for fitting in substantially air-tight engagement upon the curled rim 7 of the housing B with the drip edge 12 projecting on all sides outwardly therefrom. The plate 10 proper, however, is substantially spaced from the housing bottom-wall 5 for providing an insulating air-space 14 therebetween, as clearly shown in Figures 1 and 3.

Figure 2:
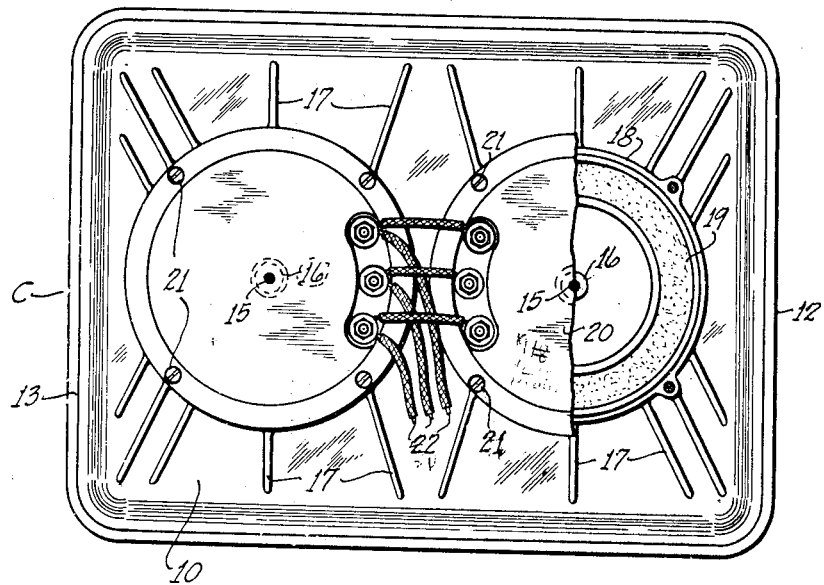
Figure 2 is a bottom plan view, partly in section, of the grid-plate, the housing being removed.

The housing B is detachably secured to the grid C by means of suitable fastening elements or screws 15 passed through the housing wall 5 for threadedly engaging suitable bosses 16 depending from the underside of the plate 10, as best shown in Figures 2 and 3, whereby the cooking-top B—C may with convenience and facility be removed as a unit from the base A by simply removing the clip-engaging end-wall screws 9.

On its underside, the grid-plate 10 is formed with a plurality of stiffening and heat-distributing ribs 17, as shown in Figure 2, and also one or more annular walls 18, which latter provide suitable pockets for reception of the grid-heating elements 19 retained therein by respective covers or retainer-plates 20 detachably engaged with the walls 18 by means of suitable fastening elements or screws 21, whereby the elements 19 may with ease and facility be removed for repairs or replacements. Suitable conducting elements or wires 22 lead from the heating elements 19 to a suitable source of electrical energy, preferably through the switch 4, in the usual manner for controlling the actuation of the heating elements.

And preferably to further prevent or retard dissipation and loss of cooking heat from the grid, a section 23 of asbestos or other suitable material is disposed under the heating elements 19 and over the upper face of the shell bottom wall 5, as best seen in Figures 1 and 3.

In use and operation, it will be seen that the housing B, fitted as described to the underside of the grid C, serves most effectively for insulating the grid against loss of heat from its underside, and since merely the drip-flange 12 of the grid is exposed at the sides of the housing B, it will be evident that the flow of heat from the non-cooking side or sides of the grid C is substantially reduced and of relatively negligible proportion, the resulting conservation of heat being effective for increasing both the heat-storage capacity of the grid and the efficient utilization of the heat applied thereto.

These desirable results are accomplished in my new grill construction in a simple and inexpensive manner, and it may be stated, in addition, the drip-edge 12, overhanging the housing sidewalls 6, serves effectively for preventing the deposit of drippings thereon; the tight joint between the housing rim 7 and the flange-groove 13 likewise prevents the entry of foreign matter into the air space 14 and thereby protects the heating-elements and wiring disposed therein; the heat in the grid is evenly distributed and of a uniform character; the grid-flange 11, being of relatively small dimensions, may be readily cleaned, and in fact, the grill in general may with ease and facility be maintained in a highly sanitary condition. Further, the grid as a whole may be economically manufactured, is compact and durable, and is exceedingly efficient in the performance of its intended functions.

It will be understood that changes and modifications in the form, construction, arrangement, and combination of the several parts of the grill may be made and substituted for those herein shown and described without departing from the nature and principle of my invention.

Having thus described my invention, what I claim and desire to secure by Letters Patent, is—

1. In a grid, a pan-like shell having a base wall and an upstanding marginal side wall, a cooking-plate disposed in parallel relation over the shell base wall and rested marginally on the rim of the shell side wall, annular pocket-providing ribs on the under face of the plate, heating-elements disposed in said pockets, element retaining plates attached marginally to the ribs and disposed flatwise under the contained elements, and securing-screws engaging the shell and cooking-plate.

2. In a grid, a pan-like shell having a base wall and an upstanding marginal side wall, a cooking-plate disposed in parallel relation over the shell base wall and rested marginally on the rim of the shell side wall, annular pocket-providing ribs on the under face of the plate, heating-elements disposed in said pockets, element retaining plates attached marginally to the ribs and disposed flatwise under the contained elements, and securing-screws engaging the shell and cooking-plate, the plate on its under face being also formed with a plurality of stiffening and heat distributing ribs radiating from the pocket-providing ribs.

JULIAN R. BURCH.